Figure 1:
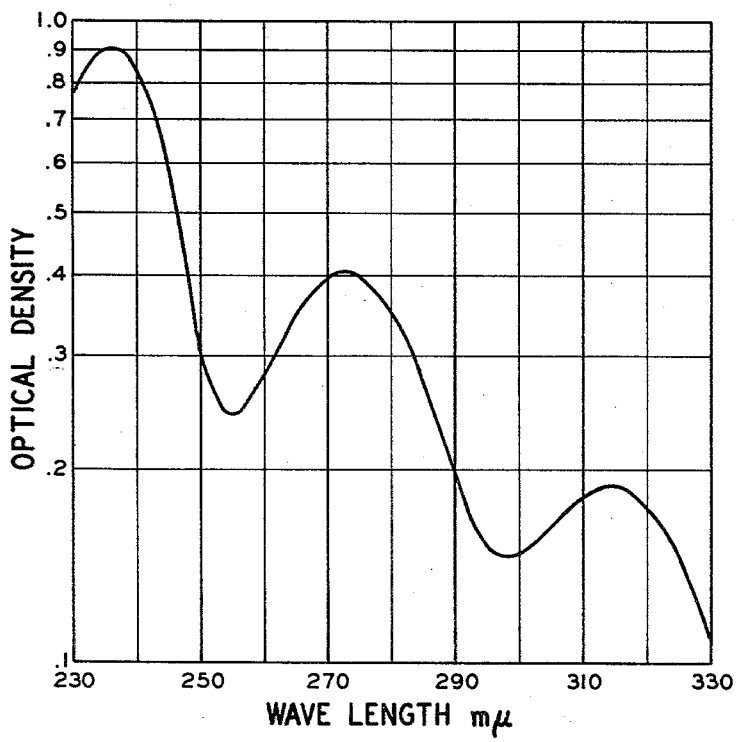
Figure 2:
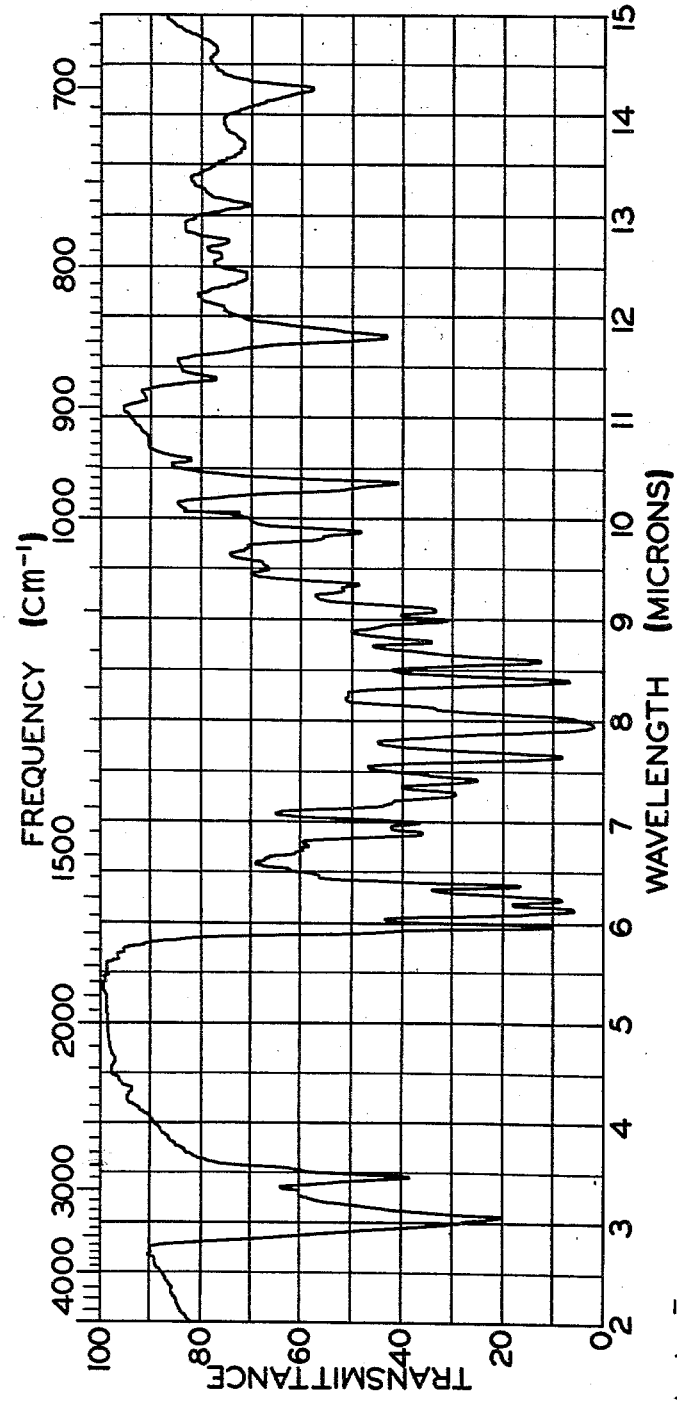

United States Patent Office 3,196,019
Patented July 20, 1965

3,196,019
ANABOLIC AND ESTROGENIC COMPOUND
AND PROCESS OF MAKING
Frederick N. Andrews and Martin Stob, West Lafayette, Ind., assignors to Purdue Research Foundation, a corporation of Indiana
Filed Apr. 6, 1964, Ser. No. 360,797
15 Claims. (Cl. 99—2)

Our invention relates to a new and useful anabolic substance and to a process for its production. More particularly, it relates to ananabolic substance produced from the microorganism *Gibberella zeae* (Gordon) denoted as NRRL–2830 and to a method for its production by fermentation.

This application is a continuation-in-part of our U.S. patent application Serial No. 144,281, filed October 2, 1961, which in turn is a continuation-in-part of application Serial No. 76,314, filed December 16, 1960, now abandoned.

Due to the considerable expense involved in the raising of meat-producing animals, various aids have been developed which tend to increase the rate of growth in such animals. Many of these aids, among them certain anabolic estrogens such as diethylstilbestrol, however, have drawbacks in actual usage such as toxicity, undesirable side effects, and difficulty in administration.

We have now provided an anabolic and estrogenic composition which not only aids in increasing the rate of growth in meat-producing animals but can be administered safely and economically without accompanying adverse side effects.

Our new anabolic composition which produces weight gain in meat-producing animals is readily produced by cultivating the organism *Gibberella zeae* (Gordon) on a suitable nutrient medium. A live culture of the organism is on deposit at the Northern Utilization Research and Development Division of the United States Department of Agriculture under the number NRRL–2830. The organism was isolated from corn grown on a farm near Delphi, Indiana, and the culture was purified by several single colony isolations. The following is the morphological description of the organism grown on Czapek's dextrose agar of the composition shown in Table I:

TABLE I

Czapek's dextrose agar: Grams/liter
  Sodium nitrate _____ 2.0
  Potassium chloride _____ 0.5
  Magnesium sulfate _____ 0.5
  Ferrous sulfate _____ 0.01
  Potassium acid phosphate _____ 1.0
  Dextrose _____ 50.0
  Agar _____ 15.0
  Q.s. 1,000 ml. distilled water.

The organism is a rapidly growing fungus, reaching a colony diameter of 9 cm. in four days at 22–25° C. In diffuse light or darkness an extensive cottony aerial mycelium develops with the colony center exhibiting a dark yellow color which tends toward pink or white at the colony periphery. Under 450 foot candles of fluorescent light the colony is darker yellow with less aerial mycelia. Reverse of the culture is deep red as the result of the production of water insoluble pigment.

Production of macroconidia is rare in darkness and abundant under light. The macroconidia are borne in slimy masses variable in length ranging from 7.6 microns to 44 microns and contain from 0 to 5 septations with a well-defined foot cell. The width of the macroconidia is more constant ranging from 2.5 to 5 microns, generally around 4.5 microns. The macroconidia are curved with 3 to 4 septations with a length of 30 to 40. Chlamydospores are intercalary and scarce.

Perithecia in culture are sparsely produced under normal conditions of light in three weeks. The perithecia is black and elliptical having a diameter of 220 by 170 microns. Asci within the perithecia are elongated (50–60 microns long and 6.6 microns wide). Ascospores are straight or slightly bent having 3 septa and being hyaline. The ascospores are 19 to 22 microns long by 2 microns wide and are pointed at the ends.

Our new anabolic compound, hereinafter referred to as "the anabolic substance" is prepared by incubating the spores or the vegetative mycelia of our new organism in a suitable inoculation medium and then introducing the microorganism-containing inoculation medium into a fermentation medium containing one of the common grains as the carbohydrate source.

In carrying out the fermentation step of our invention, we can utilize as the carbohydrate source any of the common grains such as corn, oats, wheat, barley, and the like. We prefer to use corn. The temperature of the fermentation medium can be varied from about 22 to about 32° C., but we prefer to utilize temperatures of from about 25 to about 28° C. The pH of the fermentation medium should be maintained in a wide range of from about 3.5 to about 8.5. However, for maximum yield, we prefer a starting pH of from about 5.0 to about 5.6 and a final pH of from about 6.0 to about 7.6. While liquid fermentation media can be satisfactorily utilized, we prefer a water-dampened, but essentially solid, medium. We prefer also to carry out the fermentation in the absence of light.

Generally, under the above conditions, a suitable yield of our anabolic substance can be obtained in a period ranging from 6 to 20 days. However, depending on the vitality of the microorganism, this period may be somewhat shorter or somewhat longer.

The thus produced anabolic substance can then be administered to animals by any suitable method including oral and parenteral administrations. For example, after the fermentation period the fermentation medium can be blended with ordinary feed and thus be fed directly to animals. The anabolic substance can also be recovered by any suitable process and the recovered product then can be suspended in a suitable injection suspension medium such as peanut oil and injected parenterally.

In order to recover the anabolic substance, we prefer to first extract the fermentation medium with ethanol preferably of about 95% concentration and then to concentrate the extract containing the anabolic substance. The concentrate is then dissolved in chloroform and in turn extracted with a sodium carbonate solution, preferably of a concentration of about 5% having an adjusted pH of about 9–12 but preferably of about 11.2. The pH of the sodium carbonate extract is then adjusted with hydrochloric acid to about 6.0 to about 6.5 to precipitate the solid impure anabolic material. To obtain maximum precipitation, we prefer to adjust the pH to about 6.2. This impure precipitate is then extracted with ether and subsequently dried to obtain a dry solid material suitable for feeding to animals. If a material of higher purity is desired, the dry solid anabolic substance obtained as described above can be subjected to multiple transfer countercurrent distribution employing a suitable solvent system, and the active component separated according to the Craig method described in Techniques of Organic Chemistry, vol. 3, chapter 4, second edition, edited by A. Weissberger, Interscience Publications Incorporated. This method consists essentially of placing in each of a prescribed number of tubes a fixed and equal amount of a lower phase solvent system, the first of such tubes containing a prescribed amount of the material to be separated and identified, then adding to the first tube an amount of an upper phase solvent equal to the amount of the lower phase in the first tube, thoroughly mixing the two phases in the first tube and allowing them to again separate, then transferring the upper phase to a second tube whereupon an identical amount of fresh upper phase solvent system is again added to the first tube. This procedure is continued for any desired number of tubes. The tube containing the largest amount of the active material is determined and a physical constant termed the operating coefficient then obtained. The operating coefficient is calculated using the following formula:

$$K=\frac{n}{N-n}$$

where K is operating coefficient, N is the total number of transfer tubes utilized in the system, and $n$ is the number of the tube in which the most active material is found.

In utilizing the countercurrent distribution procedure for purification of our new anabolic substance, we can utilize any suitable solvent system which has a simple distribution coefficient of not less than 0.2 and not more than 5.0. The simple distribution coefficient can be termed the ratio of the amount of the material which is dissolved in the upper phase of the solvent system employed to the amount found in the lower phase. Among the solvent systems which we have found useful are a system containing a lower phase consisting of two parts $CHCl_3$, two parts $CCl_4$, and an upper phase consisting of three parts of $CH_3OH$, two parts $H_2O$, all parts by volume and a system consisting of a lower phase containing two parts $CHCl_3$, two parts $CCl_4$, and an upper phase containing four parts $CH_3OH$, one part $H_2O$, all parts by volume.

Using the Craig method of purification through 100 tubes as described above, a solvent system consisting of two parts chloroform and two parts carbon tetrachloride as the lower phase and four parts methanol and one part water as the upper phase, all parts by volume, dry anabolic substance obtained by culturing the organism *Gibberella zeae* (Gordon) NRRL–2830 on a water-dampened corn medium and recovered by extracting the medium with ethanol, concentrating the extract, dissolving in chloroform, extracting with aqueous sodium carbonate, adjusting the pH with hydrochloric acid to precipitate a solid product which is then extracted with ether and dried as described above, a simple distribution coefficient of 0.40 and an operating coefficient of 0.54 were obtained.

The purified anabolic substance is very soluble in methylene chloride, ethanol, butyl acetate, 1,4-dioxane, and ethyl ether; soluble in methanol, butanol, chloroform, and acetone; slightly soluble in hexane, petroleum ether, and heptane; and insoluble in dimethylformamide and water.

The anabolic substance gives a negative ninhydrin test when dried on cellulose and absorbs readily on alumina from a methylene chloride solution.

Ultraviolet absorption studies have been conducted on a methanolic solution of the estrogen. The ultraviolet absorption spectrum of the material is shown in FIGURE I of the accompanying drawings. The curve shows an absorption maximum at 236, 274, and 313 millimicrons and an absorption minimum at 255 and 300 millimicrons.

A solution of the anabolic substance, the solution having a pH of 6.0 and consisting of two parts chloroform, two parts carbon tetrachloride, three parts methanol, and two parts water, all parts by volume, when exposed to high intensity ultraviolet light yields a bright greenish blue fluorescence.

An infrared spectrum of our new anabolic substance pelleted with potassium bromide is shown in FIGURE II of the accompanying drawings. The following table shows the infrared absorption characteristics of our new anabolic substance.

TABLE II

*Infrared absorption spectrum in microns*

| | | | |
|---|---|---|---|
| 3.04 S | 7.15 Sh | 9.05 W | 11.13 W |
| 3.31 W | 7.25 W | 9.25 Sh | 11.34 W |
| 3.44 S | 7.39 W | 9.31 W | 11.45 W |
| 3.50 Sh | 7.62 M | 9.5 W | 11.76 M |
| 5.88 Sh | 7.94 S | 9.55 Sh | 12.05 W |
| 5.93 S | 8.10 Sh | 9.65 Sh | 12.38 W |
| 6.07 M | 8.20 W | 9.73 Sh | 12.53 V.W. |
| 6.20 W | 8.36 M | 9.83 W | 12.68 W |
| 6.34 M | 8.57 M | 9.94 Sh | 13.05 W |
| 6.70 Br | 8.76 W | 10.31 M | 13.63 M |
| 6.85 W | 8.88 Sh | 10.54 W | 14.21 M |
| 6.96 W | 8.96 W | 10.73 V.W. | 14.57 V.W. |

S—Strong absorption.
M—Medium absorption.
W—Weak absorption.
Sh—Shoulder.
Br—Broad absorption.
V.W.—Very weak.

The anabolic substance shows a melting point of 164–165° C.

The anabolic substance shows the following optical rotation in methanol: $[\alpha]_D^{25°}=-109.5°$.

It has the structural formula:

Our new anabolic substance is an effective growth promoting material for use in animal nutrition. The following Table III shows the results if lamb growth studies utilizing eight lambs fed a commercial type ration for 28 days. The average daily weight gain of these lambs was 0.27 lb.

TABLE III

| Initial wt. in pounds of lambs not injected with the anabolic substance | Final wt. at end of 28-day test |
|---|---|
| 74.0 | 74.5 |
| 65.0 | 72.5 |
| 61.0 | 66.0 |
| 69.0 | 78.0 |
| 71.5 | 84.0 |
| 72.5 | 79.0 |
| 76.0 | 83.0 |
| 77.0 | 88.5 |
| Avg. 70.8 | Avg. 79.4 |

Table IV shows the results of lamb growth studies using the same commercial feed as used by the lambs in Table III supplemented with daily subcutaneous injections of 33 units of our anabolic substance for 28 days. One unit of our anabolic substance is the amount of that substance needed to produce the response given by 1 microgram of diethylstilbestrol. The average daily weight gain of these lambs treated with our anabolic substance was 0.38 lb. which represents a 40% improvement in weight gain over the lambs of Table III.

TABLE IV

| Initial wt. in pounds of lambs injected with three units daily of anabolic substance | Final wt. at end of 28-day test |
|---|---|
| 68.0 | 75.0 |
| 66.0 | 80.5 |
| 70.0 | 81.0 |
| 71.5 | 81.5 |
| 74.0 | 86.0 |
| 77.0 | 93.5 |
| 79.5 | 82.0 |
| Avg. 71.6 | Avg. 82.8 |

The average feed conversion of the eight lambs to which no anabolic substance was administered was 10.28 pounds of feed consumed per pound of weight gain while the average feed conversion for the lambs to which the anabolic substance was administered was 8.08 pounds of feed consumed per pound of weight gain.

The following examples are offered to illustrate our invention; and we do not intend to be limited to the specific materials, amounts, and procedures set forth. The first example illustrates preparation of a suitable inoculum containing the organism Gibberella zeae (Gordon) NRRL-2830.

EXAMPLE I

A spore sand culture containing Gibberella zeae (Gordon) NRRL-2830 was aseptically placed in a sterile tube containing 15 ml. of Czapek's-Dox solution and a small amount of agar. This medium was then incubated for about 168 hours at approximately 25° C. At the end of the incubation period, the medium was washed with 5 ml. of sterile deionized water and transferred to a sterile tube containing 45 ml. of Czapek's-Dox solution. The contents of the tube were then incubated for about 96 hours at about 25° C. after which the material was available for use in inoculation of a fermentation medium.

The following example illustrates the fermentation of the organism Gibberella zeae (Gordon) NRRL-2830.

EXAMPLE II

To a 2-liter flask were added 300 grams of finely divided corn. The flask and its contents were then sterilized and after sterilization 150 ml. of sterile deionized water were added. To the mixture in the flask were then added 45 ml. of the inoculum prepared by the process of Example I and the material was thoroughly mixed. The mixed material was then incubated for about 20 days at 25° C. in a dark room in a water-saturated atmosphere.

The following example illustrates the recovery of the anabolic substance from the fermentation medium.

EXAMPLE III

A 300-gram portion of fermented material produced by the method of Example II was placed in 500 ml. of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 ml. of ethanol. This procedure was repeated three more times. The ethanol extract was then dried under vacuum to give 6.84 grams of solid material. This solid material was then dissolved in 20 ml. of chloroform and extracted with 30 ml. of an aqueous solution containing 5% by weight of sodium carbonate having an adjusted pH of about 11.2. The extraction process was repeated seven more times.

The pH of the sodium-carbonate extract was then adjusted to 6.2 with hydrochloric acid, to yield an anabolic substance-containing precipitate. The precipitate and the aqueous sodium carbonate extract were then each in turn extracted with 75 ml. of ethyl ether. This procedure was repeated three more times to yield a light yellow ethereal solution, which was then dried to yield 116 mg. of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was then tested for physiological activity according to the well known mouse-uterine test. As conducted, the mouse-uterine test consisted of feeding solid material produced from drying 5 ml. of the upper phase and 5 ml. of the lower phase from each of the selected tubes in a standard 75 gram feed to five mice for a five day period during which period all of the feed was consumed. At the end of the period, the animals were weighed and the uteri were removed and weighed. A positive response to the test was produced with the most physiologically active material being contained in tubes 30 through 40. The solid material collected from tubes 30 through 40 weighed 59 mg.

We claim:

1. A process for producing an anabolic and estrogenic composition, said estrogenic composition being a composition which is very soluble in methylene chloride, ethanol, butyl acetate, 1,4-dioxane, and ethyl ether; soluble in methanol, butanol, chloroform, and acetone; slightly soluble in hexane, petroleum ether, and heptane; insoluble in dimethylformamide and water; which displays a simple distribution coefficient of 0.40 and an operating distribution coefficient of 0.54 in a countercurrent distribution system consisting of two parts chloroform and two parts carbon tetrachloride as the lower phase and four parts methanol and one part water as the upper phase, all parts by volume, which gives a maximum ultraviolet absorption spectrum in methanol at 274 and 313 millimicrons, a minimum ultraviolet absorption spectrum in methanol at 233 and 300 millimicrons, which exhibits characteristic absorption bands in the infrared region of the spectrum when pelleted with potassium bromide at the following wave lengths in microns: 3.04, 3.31, 3.44, 3.50, 5.88, 5.93, 6.07, 6.20, 6.34, 6.70, 6.85, 6.96, 7.15, 7.25, 7.39, 7.62, 7.94, 8.10, 8.20, 8.36, 8.57, 8.76, 8.88, 8.96, 9.05, 9.25, 9.31, 9.5, 9.55, 9.65, 9.73, 9.83, 9.94, 10.31, 10.54, 10.73, 11.13, 11.34, 11.45, 11.76, 12.05, 12.38, 12.53, 12.68, 13.05, 13.63, 14.21, 14.57, which upon exposure to high intensity ultraviolet light yields a bright greenish blue fluorescence in a solvent consisting of two parts chloroform, two parts carbon tetrachloride, three parts methanol and two parts water, all parts of the solvent by volume, the solvent having a pH of 6.0, which gives a negative ninhydrin reaction when dried on cellulose, which absorbs on alumina from a methylene chloride solution which demonstrates an optical rotation of $[\alpha]_D^{25°} = -109.5°$ and which shows a melting point of 164–165° C., which comprises cultivating the organism Gibberella zeae (Gordon) NRRL-2830 in a nutrient medium containing a grain selected from the group consisting of corn, wheat, barley, and oats, under aerobic conditions to produce an anabolic and estrogenic composition.

2. The process of claim 1 wherein the cultivating is continued for at least six days at a temperature ranging from about 22 to about 32° C.

3. The process of claim 1 wherein the cultivating is continued for at lease six days at a temperature ranging from about 25 to about 28° C. and the process is conducted in the absence of light.

4. A process for the production of an anabolic substance which comprises cultivating the organism *Gibberella zeae* (Gordon) NRRL–2830 in a nutrient medium containing a grain selected from the group consisting of corn, wheat, barley and oats, under aerobic conditions to produce an anabolic substance and recovering the anabolic substance from the resulting culture medium.

5. The process of claim 4 wherein the grain is corn, the culture medium is a water-dampened but essentially solid medium, the temperature of the medium is from about 22 to 32° C., and the pH of the medium is from about 3.5 to 8.5.

6. The process of claim 5 wherein the pH is from about 5.0 to 7.6 and the culturing is conducted in the absence of light for at least about 6 days.

7. The process of claim 4 wherein the recovery is effected by separating the solids from the culture medium, extracting the anabolic substance from the solids, concentrating the extract containing the anabolic substance and precipitating the anabolic substance to provide solid material containing the anabolic substance, dissolving the anabolic substance in chloroform, extracting the anabolic substance from the chloroform, from the extract to obtain the anabolic substance.

8. The method of claim 4 wherein the recovery of the anabolic substance is effected by contacting the anabolic substance from the culture medium with ethanol to provide an ethanol extract containing anabolic substance, concentrating the ethanol extract containing the anabolic substance, dissolving the concentrate in chloroform to provide a resulting solution, extracting the anabolic substance from the resulting solution with a sodium carbonate solution, adjusting the pH of the sodium carbonate extract to about 6.0 to about 6.5 to precipitate and obtain the anabolic substance from the extract.

9. The process of claim 8 wherein the sodium carbonate solution is of a concentration of about 5% and has a pH of about 9 to 12, and the pH of the sodium carbonate extract is adjusted with hydrochloric acid.

10. The process of claim 9 wherein the precipitated anabolic substance is purified by extracting the precipitate with ether and drying the ether extract to obtain a purified solid anabolic substance.

11. The process of claim 10 wherein the anabolic substance is further purified by subjecting the purified substance to multiple-transfer, countercurrent distribution employing a solvent system having a simple distribution coefficient of not less than 0.2 and not more than 5.0.

12. The process of claim 11 wherein the solvent system contains a lower phase consisting essentially of two parts $CHCl_3$, and two parts $CCl_4$, and an upper phase consisting essentially of three to four parts $CH_3OH$, and one to two parts $H_2O$, all parts by volume.

13. The compound having the formula:

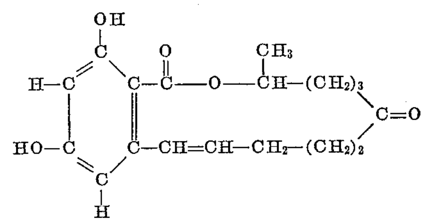

14. A process for producing a growth promoting effect in animals which comprises administering to the animal a feed containing a sufficient amount of a compound having the formula 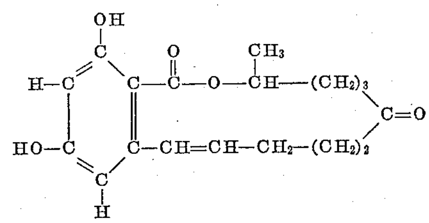 to promote the growth of the animal.

15. The process of claim 14 wherein the animal is a lamb.

References Cited by the Examiner

UNITED STATES PATENTS

| | | | |
|---|---|---|---|
| 2,842,051 | 7/58 | Brian et al. | 99—2 |
| 2,913,340 | 11/59 | Chornock et al. | 99—2 |
| 2,943,938 | 7/60 | De Zeeuw et al. | 99—2 |

OTHER REFERENCES

Animal Scientists Report on Feeding Studies With Beef Cattle and Lambs, Feedstuff, pp. 10–14, Dec. 20, 1958.

A. LOUIS MONACELL, *Primary Examiner.*